United States Patent
Dickson

(10) Patent No.: US 7,440,854 B2
(45) Date of Patent: Oct. 21, 2008

(54) DENSITY AND VELOCITY BASED ASSESSMENT METHOD AND APPARATUS

(76) Inventor: William Christian Dickson, 4509 Drexel Dr., Raleigh, NC (US) 27609

( * ) Notice: Subject to any disclaimer, the term of this patent is extended or adjusted under 35 U.S.C. 154(b) by 205 days.

(21) Appl. No.: 11/404,562

(22) Filed: Apr. 14, 2006

(65) Prior Publication Data

US 2007/0244647 A1    Oct. 18, 2007

(51) Int. Cl.
G01V 1/00 (2006.01)
(52) U.S. Cl. .................................................. 702/15
(58) Field of Classification Search ............... 702/1–15; 703/1–10
See application file for complete search history.

(56) References Cited

U.S. PATENT DOCUMENTS

| | | | | |
|---|---|---|---|---|
| 5,490,062 | A | * | 2/1996 | Leach et al. ................... 702/15 |
| 6,091,669 | A | | 7/2000 | Chen |
| 6,351,991 | B1 | | 3/2002 | Sinha |
| 6,714,873 | B2 | | 3/2004 | Bakulin et al. |
| 6,885,944 | B2 | | 4/2005 | Davidson |
| 6,889,551 | B2 | | 5/2005 | Andrews et al. |
| 6,967,898 | B2 | | 11/2005 | Leaney |
| 7,177,765 | B1 | * | 2/2007 | Berge ........................... 702/16 |
| 7,280,920 | B1 | * | 10/2007 | Whiteside et al. ............. 702/15 |
| 2003/0125878 | A1 | | 7/2003 | Bakulin et al. |

OTHER PUBLICATIONS

Author; Jim Luetgert, Title; MacRay Ray Tracing Modeled Modulus free Software, Publisher; USGS, Edition or Volume,' Mac or PC software in PICT file with public freeware and free downloadable with MS word document from USGS; Pages All; On internet at site http://quake.usgs.gov/~Luetgert/Macintosh_Software/.*

D. W. Steeples "Near-Suface Geophysics: 75 Years of Progress", The Leading Edge, Oct. 2005, pp. S82-S85, vol. 24, Issue S1, USA.

C. J. Ammon, "Seismic Waves and Earth's Interior", Aug. 1, 2001, Saint Louis University http://eqseis.geosc.psu.edu/~cammon/HTML/classes/IntroQuakes/Notes/waves_and_interior.html.

U.S. Geological survey, "Earthquake Hazards 101- The Basics", Feb. 21, 2006, http://earthquake.usgs.gov/research/hazmaps/haz101/haz101.php.

C. H. Cramer et al, "First USGS Urban Seismic Hazard Maps Predict the Effects of Soil", Seismological Research Letters, vol. 77, No. 1 Jan./Feb. 2006, USA.

* cited by examiner

Primary Examiner—Tung S Lau
Assistant Examiner—Xiuquin Sun
(74) Attorney, Agent, or Firm—Olive & Olive, P.A.

(57) ABSTRACT

A method and apparatus are provided for determining and expressing the elastic moduli within a body of earthen material; the method and apparatus for processing the method follows the steps of: (a) establishing the location of the body; (b) determining the Young's Modulus E using the formula $E=\rho V_p^2$; (c) determining the Shear Modulus $\mu$ using the formula $\mu=\rho V_s^2$; (d) determining a Bulk Modulus $\kappa$ using the formula $\kappa=\rho V_p^2/3(1-2\gamma)$ where $\gamma$ equals Poisson's Ratio; and (e) selecting one or more of the determined moduli and entering such selected moduli in a data processor adapted to convert such selected moduli into a visual expression as, for example, a map of the selected moduli for the purpose of oil, gas or coal exploration, or earthquake hazard mapping.

24 Claims, 5 Drawing Sheets

DENSITY AND VELOCITY BASED ASSESSMENT METHOD AND APPARATUS

The invention relates to a method and apparatus for using compression (P-wave) and shear (S-wave) wave velocity and density data related to a specific location for creating a modulus-based map of the elastic properties at such location. The invention is illustrated, by way of example, as a method and apparatus for assessing the damage potential of a location subject to a seismic event and creating a modulus based map or maps, which depict its damage potential based on its elastic properties.

Each year earthquakes and other natural catastrophic events provoked by geological instabilities cause the destruction of buildings and infrastructure, inflict substantial economic losses and kill or injure a number of victims throughout the world. Great effort is being undertaken to derive new and more accurate methods and devices for use in predicting timing, location and severity of these events. Although the accurate prediction of earthquakes and other seismic events would go a long way towards reducing the losses suffered as a result of these events, there is no indication that completely accurate predictions are on the immediate horizon. However, there are methods other than those directed to predicting earthquakes that can be employed to significantly reduce the losses inflicted by these events. One such method involves use of earthquake hazard maps.

Earthquake hazard maps depict the potential ground motion of an area during an earthquake that has a certain probability of occurring in a given location as for example somewhere in California. Earthquake hazard maps assist engineers in designing buildings, bridges, pipeline routes, evacuation routes, civil infrastructures, and the like that will be capable of withstanding the potential ground motion in a given area. Earthquake hazard maps can also be used as a basis for drafting and updating building codes that establish construction requirements, so as to ensure public safety. Earthquake hazard maps can also be used by insurance companies to calculate insurance rates for a particular building in a particular area.

Typically, earthquake hazard maps for a particular location are based on past history, geology, seismological surveys and past and current ground vibrations. Using this data, analysts often make a model depicting a potential future earthquake at the location of interest. The model, for example, may show the location of the source of the earthquake and depict different possible magnitudes of movement emanating from that source. A map is then created to depict how strong the vibrations and ground motion will be at given locations away from the source or epicenter of the earthquake.

Of importance in creating an earthquake hazard map for a particular site or location is the geological condition of the site with respect to, for example, the condition of the earth's crust and mantle. In this regard, it is to be noted that the force produced by an earthquake causes ground motion waves to travel both vertically and horizontally. These earthquake ground motion waves travel rapidly through the earth's crust and mantle. The area of the earth's crust that is closest to the outer surface of the ground is called bedrock. The extent of the ground motion experienced at the outer surface of the ground is affected by the material between the bedrock and the outer surface. Earthquake waves may move more slowly in this material than in the bedrock. This decrease in the velocity of the earthquake waves when traveling through the material between the bedrock and the outer surface results in an increase in ground motion at the outer surface for the amount of force applied to the mentioned material. It is therefore desirable to know the relationship between the velocity of the wave when traveling through the mentioned material and the elastic moduli of the material in order to better predict the severity of ground motion. The term "elastic moduli" is used here for convenience to refer either individually or collectively to Young's Modulus E, Shear Modulus $\mu$, and Bulk Modulus $\kappa$.

For the purpose of illustrating use of the method and apparatus of the present invention, and not by way of limitation, the inventive method and apparatus are described as directed to preparation of earthquake hazard maps. Other uses will become apparent as the description proceeds.

The present invention provides, among other things, a new method and apparatus for calculating and displaying in the form, for example, of an earthquake hazard map, the material properties of the soil at a location of interest. These material properties once calculated and appropriately displayed, as for example in an earthquake hazard map, may then be used for assessing, for example, damage potential at a given location based on a more reliable earthquake hazard map for such location.

The method and apparatus of the invention can utilize, by way of example, known velocity measuring methods such as reflection, refraction and propagation to determine seismic P-wave and S-wave velocities for a given location. These velocity values as well as density values associated with sites of interest then are integrated into ground motion potential maps in an indirect way by use of the elastic moduli. Knowing these velocities and the additional variable of soil density of a given location, the method and apparatus of the present invention can then be used to assess earthquake damage potential at a particular site or location by calculating the elastic characteristics of the material comprising such site or location. Based on the enhanced accuracy of damage potential assessment provided by the invention, more reliable earthquake hazard maps can then be created.

In a broad form of the invention, a method and apparatus are provided for assessing elastic characteristics of material at a particular location based on the method comprising: obtaining a density value, $\rho$, near the location; obtaining a P-wave velocity value, $V_p$, near the location; obtaining a S-wave velocity value, $V_s$, near the location; determining a Young's Modulus, E, using a formula $E=\rho V_p^2$; determining a Shear Modulus, $\mu$, using the formula $\mu=\rho V_s^2$; determining a Bulk Modulus, $\kappa$, using the formula $\kappa=\rho V_p^2/3(1-2\gamma)$, wherein $\gamma$ equals Poisson's Ratio illustrated as being determined, by way of example, by use of the equation $$Y = \frac{\left(1 - \frac{1}{2}[V_p/V_s]^2\right)}{(1-[V_p/V_s]^2)}$$

and using one or more of the determined moduli, E, $\mu$ and $\kappa$, for assessing damage (ground motion) potential. These may be combined with scenario and/or probabilistic models to create new earthquake hazard maps, which take into account the elastic moduli, size and probability of future earthquakes.

The values of these moduli are utilized and recognized by the method of the invention as being a specific property of each material. Measurement of the seismic wave velocities as they travel through a material allows determination of the properties within the material under conditions existing at that time. Since these properties are specific to each material, comparison of measured values with known standards allows remote determination of the nature of the material, e.g. oil instead of rock, and permits very specific identification of the material (such as coal vs diamond, for example, silver vs iron, or water vs oil), without physical contact. Thus, the invention can be used to locate and identify deposits of desired materials.

The invention will now be described in greater detail with reference to the attached drawings.

In one embodiment of the invention, creating modulus-based maps according to the method and apparatus of the present invention initially requires obtaining seismic velocity data related to the site of interest to include the shear-wave (S-wave) and compression-wave (P-wave) velocities, as well as the density of the soil at the desired depth. The density, S-wave and P-wave velocities are typically measured at substantially the same depth and which depth is determined to fit the particular need i.e. whether for construction, energy exploration or other need. Such data is readily available in the industry either in available databases or through the use of available density and seismic velocity measuring techniques that can be used to determine the S-wave and P-wave velocities ($V_s$ and $V_p$) at a particular site. Many databases throughout the world contain these density and velocity values for many areas around the world. For example, in the U.S., the United States Geological Society (USGS) has a database that includes velocity values for areas in and around, for example, San Francisco. Another source for seismic wave velocity values is the National Earthquake Hazard Reduction Program (NEHRP).

In the presently preferred embodiment, the density value at a particular site is determined by physical measurement. For example, one may obtain a sample of soil from a particular site. From this sample, a known volume of soil is removed and its mass is measured. The well-known ratio of mass/volume yields the soil's density ($\rho$). Other traditional means of measuring such velocity and density values are well known in the field of geophysics.

The location coordinates, the depth at which the density and velocity measurements are taken and the density and velocity values are all entered as part of the map processing as illustrated in FIGS. 2-5.

Several ways of obtaining the values for $V_p$, $V_s$ and $\rho$ have been identified above, and it is irrelevant to the method of the invention how the data is obtained, as long as the quality of the data is acceptable to the user. The accuracy of these values will of course affect the accuracy of the final result. Accordingly, an entity practicing this invention can derive such data by taking measurements itself, by using predetermined values, or by doing some of each.

Figure 4:
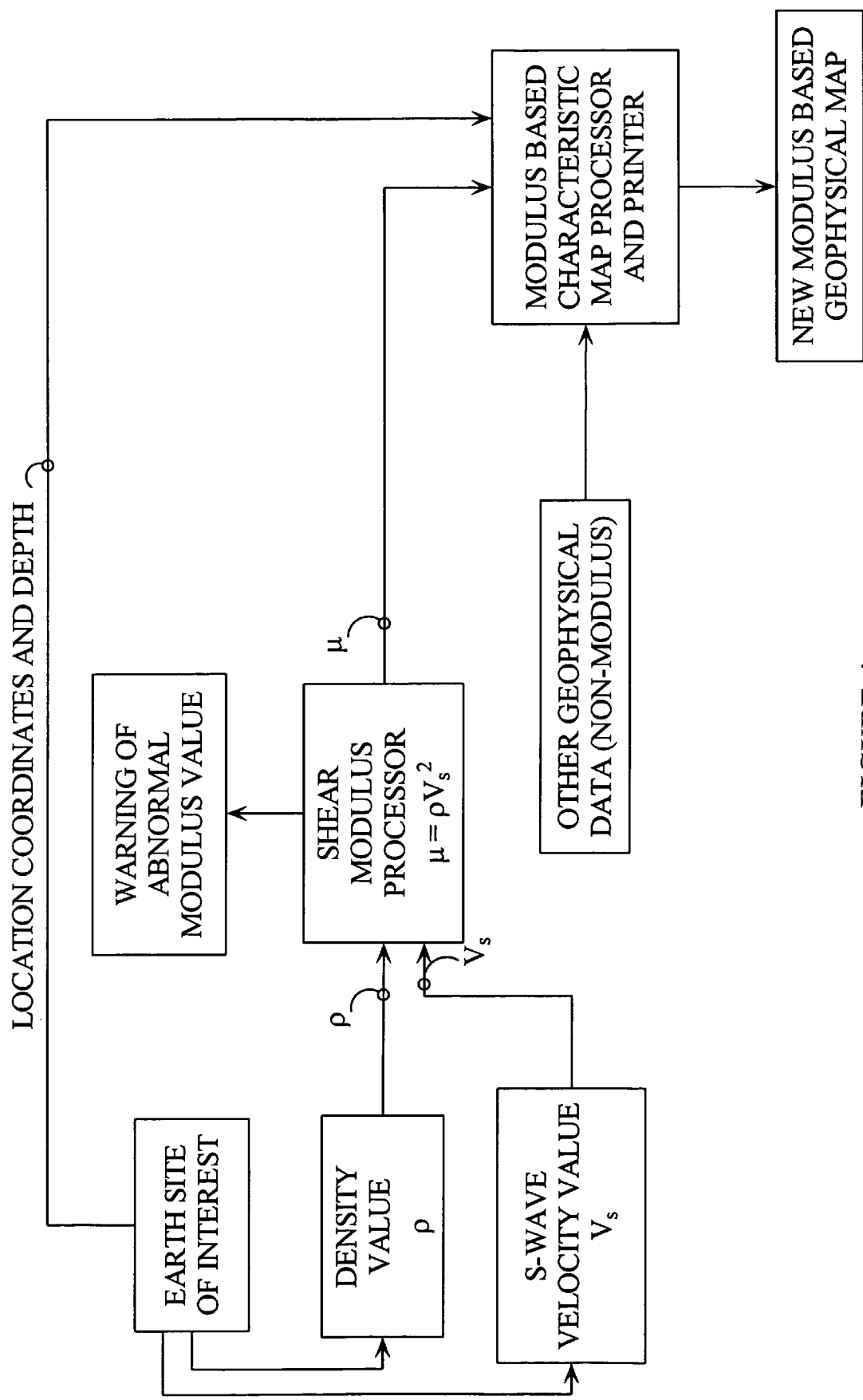
FIG. 4 is a schematic diagram of an assembly of selected components of FIG. 2 for practicing a third embodiment of the invention dependent only on use of the Shear Modulus $\mu$.

In a preferred embodiment of the invention, it is not necessary to obtain all of the velocity and elastic moduli values for a given site. For example, if an entity wishing to practice this invention is only interested in the Shear Modulus (to be further discussed herein), then such entity will only need velocity value $V_s$ and density value $\rho$ as illustrated in FIG. 4. Thus, this invention provides extraordinary new possibilities for modulus based mapping by providing a simple method for establishing the Young's, Shear and Bulk moduli directly from standard density and velocity measurements, and then using any one of these moduli values to map particular characteristics of interest. Maps can be based on each of the three moduli.

Figure 1:
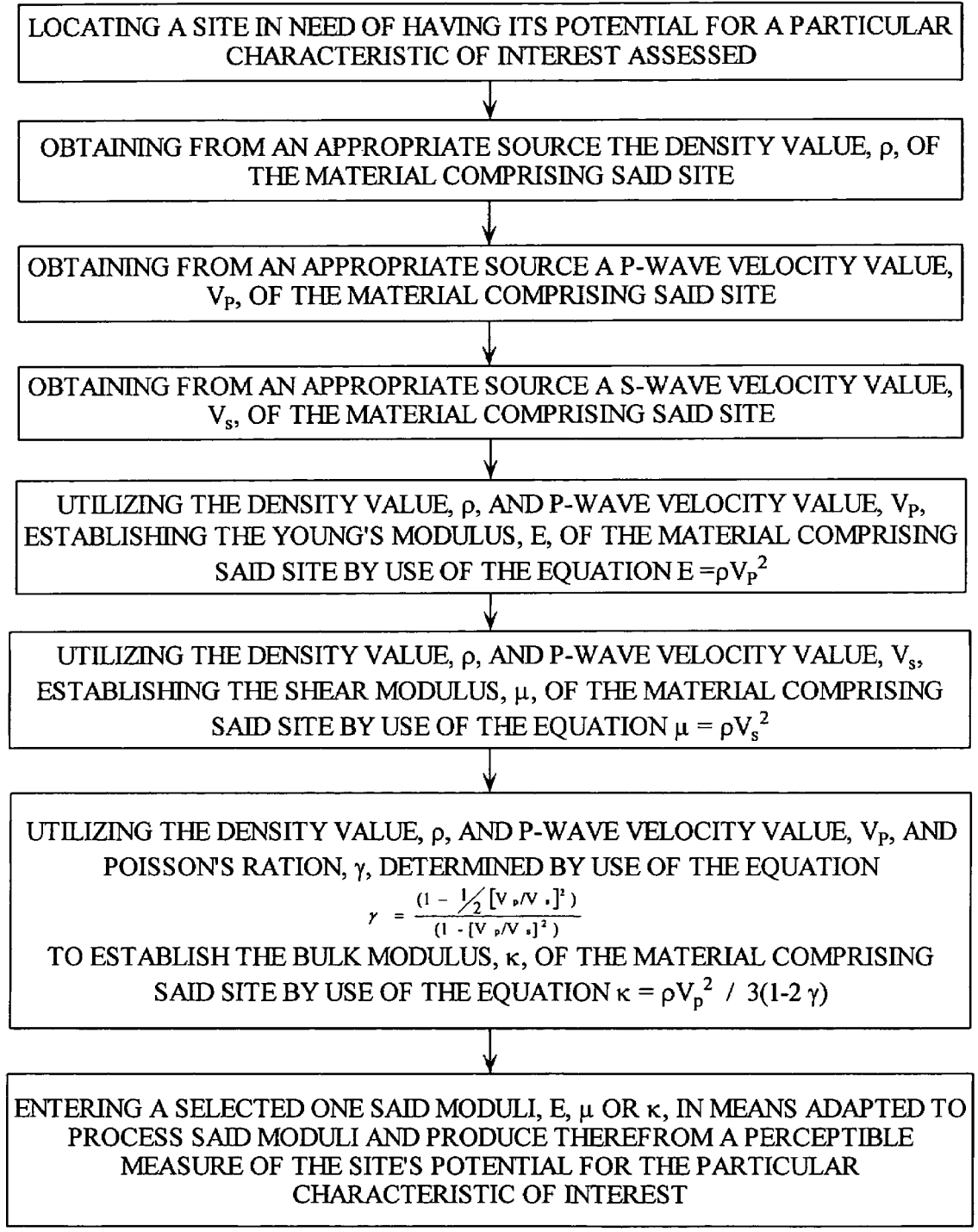
FIG. 1 is a flow diagram of the steps of the invention according to a first embodiment.
Figure 2:
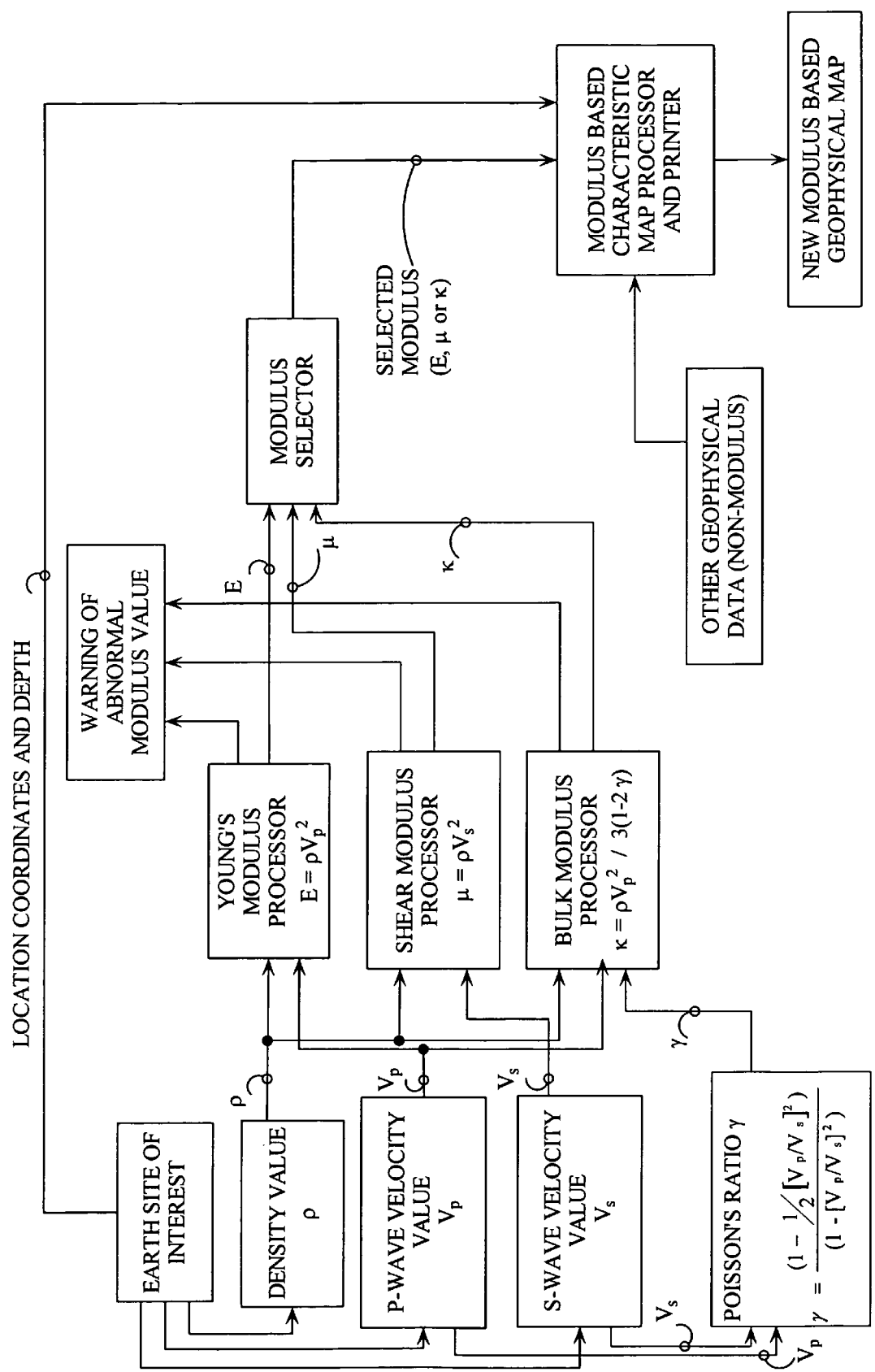
FIG. 2 is a somewhat schematic diagram of an assembly of components for practicing the method depicted in FIG. 1.

Without limiting the scope of the invention, two basic ways of practicing the method and apparatus of the invention are somewhat schematically illustrated in the drawings. FIGS. 1 and 2 are directed to a system in which Young's Modulus E, the Shear Modulus $\mu$ and the Bulk Modulus $\kappa$ are obtained and thereafter the particular Modulus E, $\mu$ or $\kappa$ is selected according to the nature of the characteristic to be determined and combined with other hazard parameter data, processed and thereafter used to print a new hazard map based on the selected modulus.

Figure 3:
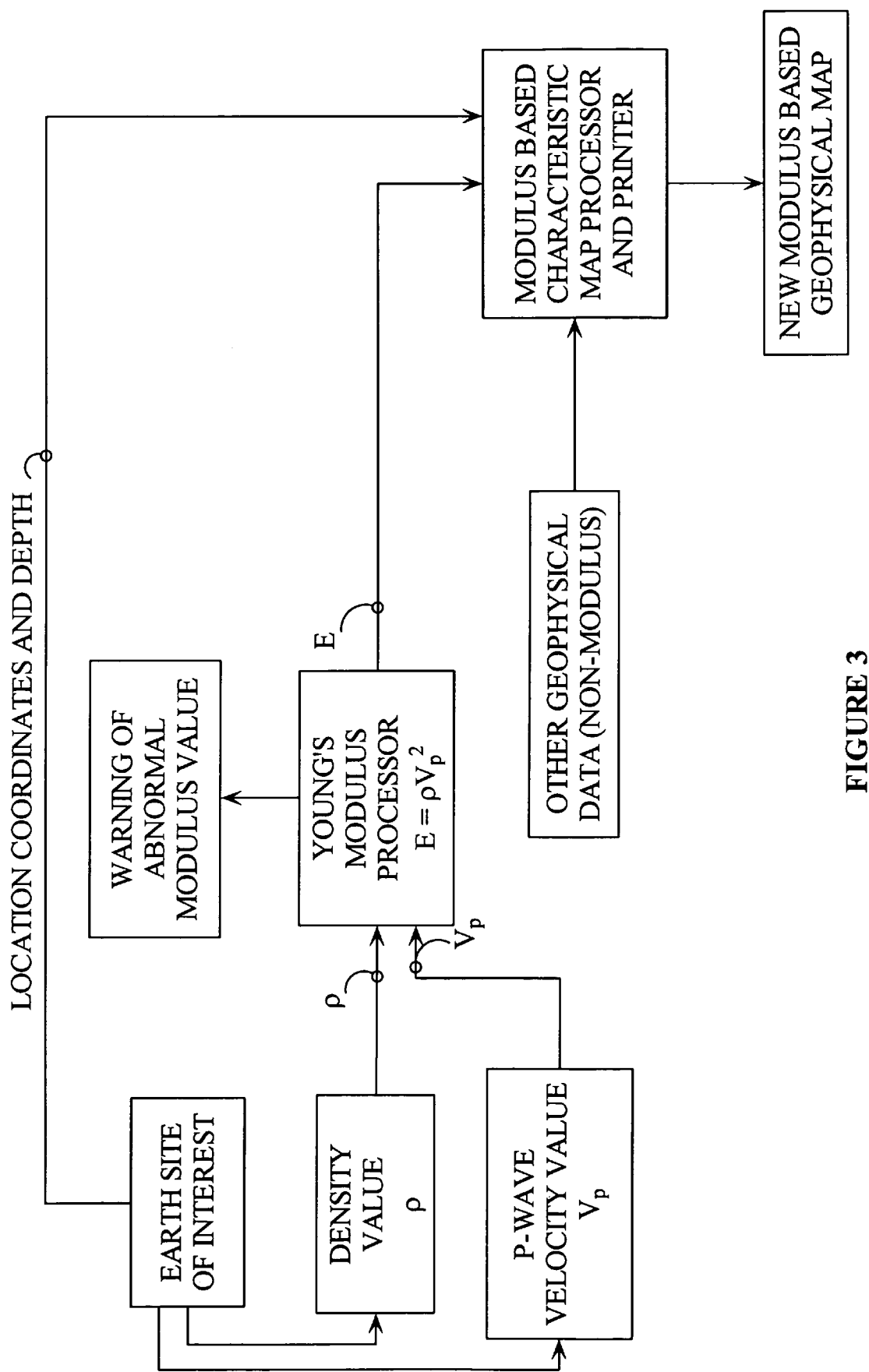
FIG. 3 is a schematic diagram of an assembly of selected components of FIG. 2 for practicing a second embodiment of the invention dependent only on use of Young's Modulus E.
Figure 5:
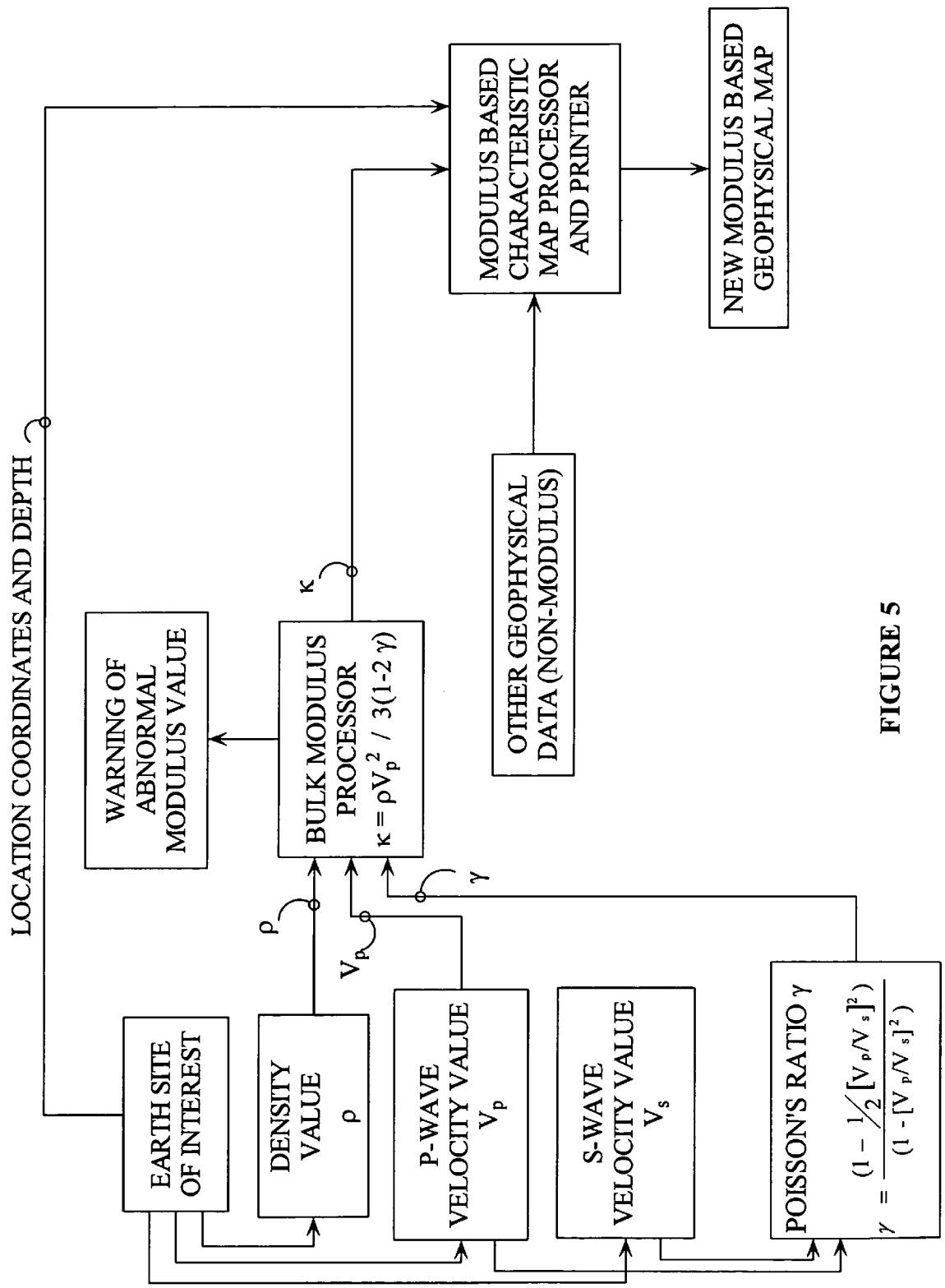
FIG. 5 is a schematic diagram of an assembly of selected components of FIG. 2 for practicing a fourth embodiment of the invention dependent only on use of the Bulk Modulus $\kappa$.

Alternative and illustrative ways of practicing the method and apparatus of the invention are schematically illustrated in FIGS. 3-5. In these alternative ways only the particular modulus that corresponds to the characteristic of interest is determined. Thus, FIG. 3 illustrates a system for producing the method of the invention in which only Young's Modulus E is determined and used to print a map; FIG. 4 represents a system in which only the Shear Modulus $\mu$ is determined and use to print a map; and FIG. 5 represents a system in which only the Bulk Modulus $\kappa$ is determined and used to print a map.

According to the present invention and as previously mentioned, a method and apparatus are provided for assessing a site of earth having a particular characteristic of interest. Such characteristics could include suitability for oil/gas exploration or underground water exploration and, perhaps most importantly, the damage potential for a site in the event of a seismic occurrence as expressed by a modulus-based earthquake hazard map based on that assessment.

It is thus clear that the method and apparatus of the invention can use the $V_p$, $V_s$ and $\rho$ values, obtained from an appropriate source, to calculate the Young's, Shear and Bulk moduli and then use these moduli to create a map, or any other rendering, capable of depicting the particular characteristic of interest. It is of paramount significance to the method of the invention that such maps/renderings can, but must not necessarily, be created from and only from such readily obtainable data as found in the P-wave velocity value $V_p$, the S-wave velocity value $V_s$ and the density value $\rho$.

In the method of the preferred embodiment being described, once the respective $V_p$, $V_s$ and $\rho$ values have been obtained from an acceptable, appropriate source, the next step is to calculate the aforesaid moduli: Young's, Shear and Bulk. The equation $E=\rho V_p^2$ allows Young's Modulus to be determined relatively simply from the appropriate density value and P-wave velocity value readily obtainable by seismic methods. In a similar manner to that of determining Young's Modulus, the Shear Modulus, $\mu$, can be established by use of the S-wave velocity value $V_s$ and appropriate density value $\rho$ in the equation: $\mu=\rho V_s^2$.

The final modulus obtained in accordance with the preferred embodiment of the method of the invention is the Bulk Modulus. The equation $\kappa=\rho V_p^2/3(1-2\gamma)$ for determining the Bulk Modulus uses the E value previously obtained and Pois son's Ratio, $\gamma$. Poisson's Ratio $\gamma$ is in turn a function of the $V_p$ and $V_s$ values previously obtained and can be stated as:

$$Y = \frac{\left(1 - \frac{1}{2}[V_p/V_s]^2\right)}{(1 - [V_p/V_s]^2)}$$

The Bulk Modulus also benefits from the direct calculation of E from the $V_p$ and $\rho$ values.

While the described elastic moduli are described for convenience as being determined in a certain order it should be understood that the method and functioning of the apparatus of the invention does not depend on the moduli being determined in a particular order. That is, the respective moduli values can be determined in any order desired.

Once the three moduli, E, $\mu$ and $\kappa$ have been established, a modulus-based map can be created from any of the moduli depending on which modulus is suited to the characteristic of interest. The newly derived equations disclosed in this application now make it possible to calculate the elastic moduli for a location, and subsequently, as claimed in this application, map these moduli. The creation of these maps will vary based upon their intended use, e.g. earthquake damage potential, oil/gas/water exploration or other use. A modulus-based map for hazard reduction or natural resource exploration may be constructed from many individual modulus calculations based on local measurements of the seismic wave velocities, combined with soil density measurements at each point or location.

In a preferred embodiment of the invention, after such of the three moduli are established as needed, each moduli so established is paired with the associated map coordinate, and this becomes one map point. Repetition of this process across an area will produce a table of modulus values versus location. These values may be color coded and displayed in the form of a map or chart for use by engineers, civil planners, resource exploration geophysicists, etc.

The type of velocity measurement to be made, and ultimately become a component of the mapped modulus value, depends on the required, or desired, modulus. One modulus, Young's, determines the tension-compression characteristics and depends on the pressure wave velocity.

A second modulus, Shear, determines the response to shearing forces, and is dependant on the shear-wave velocity. The third modulus, Bulk, relates to the amount of cross-sectional shrinkage as the material is stretched. The Bulk Modulus is dependant on both velocities and thus requires values for both velocities.

The method and apparatus of the present invention are valuable in many areas. For example, the method now permits determination of the amount of ground motion that an area will experience during an earthquake on account of the elastic properties of the soil. The new formulas derived by the applicant allow the elastic properties of the soil to be quantified, through the use of known density, P-wave velocity and S-wave velocity values, in the form of the elastic moduli: Young's, Shear and Bulk. The method of the invention thus gives an estimate of the amount of damage to be expected during an earthquake by using measurements of small sound waves (man-made) to predict the response to larger ones (earthquake). Furthermore, these measurements now allow calculation of the elastic moduli directly. These calculated modulus values may now be mapped as a function of location to produce earthquake hazard maps. Rather than relying on the past history, recent activity and other hazard map data typically used today, these new earthquake maps may be supplemented to include the elastic moduli values in addition to other hazard map data already in use. The method of the invention also makes it possible to replace current hazard data completely with the elastic moduli values to create earthquake hazard maps based solely on the elastic properties of the soil at a particular location. Localized areas of stress build-up can now be revealed by virtue of their abnormal modulus prior to an earthquake occurring, thus allowing for improved public disaster preparedness and response. Use of the method of the invention also allows for more accurate location of faults and their condition, as well as assessment of the earth's resources for economic benefit and management.

Although the invention has been described primarily in the context of earthquake probability mapping, the method and apparatus of the invention has numerous other uses and advantages. By way of example and not limitation, the method and apparatus of the invention:

(1) Provides an indication of the relationship between velocity data and ground motion.
(2) Maximizes the significance of velocity data by avoiding direct usage of the velocity data.
(3) Uses velocity squared data to calculate the modulus, thus making small, seemingly insignificant variations in velocity become large, easy to recognize differences when squared.
(4) Provides an earthquake hazard map based on the elastic moduli of a particular location.
(5) Permits an earthquake hazard map to be constructed that is based solely on known velocity and density data.
(6) Provides time history of modulus calculations that may be mapped to show areas (3D) where the modulus is changing.
(7) Enables the rate of the change of the modulus to be calculated and displayed.
(8) Shows groundwater penetration (3D) of soils.
(9) Provides means for resource and liquefaction potential mapping.
(10) Provides the ability to locate and identify underground materials, whether solid, fluid, or gaseous, by modulus determination or estimation.

What is claimed is:

1. A method for determining the existence of a particular characteristic of interest in a body of earth comprising:
    (a) locating the body of earth in which existence of the particular characteristic of interest is to be determined;
    (b) based on the nature of the said characteristic of interest, determining, in addition to a density value $\rho$, either or both of the following velocity values of the material comprising said body of earth:
        (i) a P-wave velocity value, $V_p$; and
        (ii) a S-wave velocity value, $V_s$;
    (c) following determination of the aforesaid density value and either one or both velocity values and based on the nature of the characteristic of interest to be determined, determining the value of any one or all of the following moduli:
        (i) provided velocity value $V_p$ has been determined, Young's Modulus E, for said body of earth by use of the equation $E = \rho V_p^2$;
        (ii) provided velocity value $V_s$ has been determined, Shear Modulus $\mu$, for said body of earth by use of the equation $\mu = \rho V_s^2$; and
        (iii) provided both velocity value $V_p$ and $V_s$ have been determined, Bulk Modulus, $\kappa$, for said body of earth by using Poisson's Ratio, $\gamma$, and the equation $\kappa = \rho V_p^2 / 3(1 - 2\gamma)$; and (d) based on the nature of the characteristic of interest to be determined, entering the value of a selected one of said moduli in means adapted to process said selected moduli and produce therefrom a perceptible measure of said characteristic of interest at the location of said body.

2. The method of claim 1 wherein the said characteristic of interest requires determining and processing said values $\rho$, $V_p$ and Young's Modulus E.

3. The method of claim 2 wherein said perceptible measure of said characteristic is in the form of an earthquake hazard map.

4. The method of claim 1 wherein the said characteristic of interest requires determining and processing said values $\rho$, $V_s$ and Shear Modulus $\mu$.

5. The method of claim 4 wherein said perceptible measure of said characteristic is in the form of an earthquake hazard map.

6. The method of claim 1 wherein said characteristic of interest requires determining and processing said values $\rho$, $V_p$ and $V_s$ and Bulk Modulus $\kappa$.

7. The method of claim 6 wherein said perceptible measure of said characteristic is in the form of an earthquake hazard map.

8. The method of claim 1 wherein said perceptible measure of said characteristic is in the form of an earthquake hazard map.

9. The method of claim 8 wherein said perceptible measure of said characteristic is in the form of an earthquake hazard map.

10. The method according to claim 1 wherein said Poisson's ratio is determined by use of the equation $$\gamma = \frac{\left(1 - \frac{1}{2}[V_p/V_s]^2\right)}{(1 - [V_p/V_s]^2)}.$$

11. The method according to claim 1 wherein said characteristic of interest comprises the earthquake damage potential of said site and said means forms an earthquake hazard map representative of said damage potential based on said selected moduli.

12. The method of claim 1 wherein the said characteristic of interest relates to the potential energy contained in said body of earth.

13. The method of claim 12 wherein said potential energy is in the form of oil, gas and coal contained in said body of earth.

14. The method of claim 1 wherein said perceptible measure of said characteristic of interest comprises an earthquake hazard map and including means for forming said map so as to include other geophysical parameter data.

15. A method for determining the existence of a particular characteristic of interest in a body of earth comprising:
    (a) locating the body of earth in which existence of the particular characteristic of interest is to be determined;
    (b) deriving Young's, Shear and Bulk Moduli for said body of earth directly from known density, P-wave velocity and S-wave velocity values; and
    (c) using a selected one of said moduli in operative association with means for creating a perceptible measure of said characteristic of interest at the location of said body.

16. The method of claim 15 wherein said particular characteristic of interest is that of earthquake potential and said perceptible measure of said characteristic of interest in is an earthquake hazard map.

17. The method of claim 15 wherein said particular characteristic of interest relates to the potential energy contained in said body of earth.

18. The method of claim 17 wherein said potential energy is in the form of oil, gas or coal.

19. A method for determining the existence of a particular characteristic of interest in a body providing a path for P-wave and S-wave travel, comprising:
    (a) locating the body in which existence of the particular characteristic of interest is to be determined;
    (b) based on the nature of the said characteristic of interest determining, in addition to a density value $\rho$, either or both of the following velocity values of the material comprising said body:
        (i) a P-wave velocity value, $V_p$; and
        (ii) a S-wave velocity value, $V_s$;
    (c) following determination of the aforesaid density value and either one or both velocity values depending on need and based on the nature of the characteristic of interest to be determined, determining the value of any one or all of the following moduli:
        (i) provided velocity value $V_p$ has been determined, Young's Modulus E, for said body of earth by use of the equation $E=\rho V_p^2$;
        (ii) provided velocity value $V_s$ has been determined, Shear Modulus $\mu$, for said body of earth by use of the equation $\mu=\rho V_s^2$; and
        (iii) provided velocity value $V_p$, velocity value $V_s$, and Poisson's Ratio, $\gamma$, have been determined, Bulk Modulus, $\kappa$, for said body of earth by using Poisson's Ratio, $\gamma$, and the equation $\kappa=\rho V_p^2/3(1-2\gamma)$; and (d) based on the nature of the characteristic of interest to be determined, entering the value of a selected one of said moduli in means adapted to process said selected moduli and produce therefrom a perceptible measure of said characteristic of interest at the location of said body.

20. The method according to claim 19 wherein said Poisson's Ratio is determined by use of the equation $$\gamma = \frac{\left(1 - \frac{1}{2}[V_p/V_s]^2\right)}{(1 - [V_p/V_s]^2)}.$$

21. An apparatus for determining the existence of a particular characteristic of interest in a body capable of sustaining P-waves and S-waves, comprising:
    (a) sources providing the location of said body the values of its density $\rho$, its P-wave velocity $V_p$, and S-wave velocity $V_s$ at a known depth at said location and the value of its Poisson's Ratio;
    (b) first processing means adapted for receiving data reporting the values of the density $\rho$ and the P-wave velocity $V_p$ and calculating therefrom Young's Modulus E by use of the equation $E=\rho V_p^2$;
    (c) second processing means adapted for receiving data representing the values of the density $\rho$ and the S-wave velocity $V_s$, and calculating therefrom the Shear Modulus $\mu$ by use of the equation $\mu=\rho V_s^2$;
    (d) third processing means adapted for receiving data representing the values of the density $\rho$, the S-wave velocity $V_p$ and Poisson's Ratio $\gamma$ and calculating therefrom the Bulk Modulus $\kappa$ by use of the equation $\kappa=\rho V_p^2/3(1-2\gamma)$; and (e) fourth processing means adapted for receiving data representing a selected one of said moduli and producing therefrom a perceptible measure of said characteristic of interest.

22. An apparatus as claimed in claim 21 wherein said body comprises a body of earth, said characteristic of interest comprises the earthquake potential of said body of earth and said perceptible measure of said characteristic of interest comprises an earthquake hazard map.

23. An apparatus as claimed in claim 21 including means for producing a perceptible form of warning upon any of said moduli being found abnormal.

24. An apparatus as claimed in claim 21 wherein said body comprises a body of earth.

* * * * *